(12) United States Patent
Henderson et al.

(10) Patent No.: US 7,307,986 B2
(45) Date of Patent: Dec. 11, 2007

(54) STATE RECORD PROCESSING

(75) Inventors: Alex E. Henderson, Hillsborough, CA (US); Walter E. Croft, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 10/358,982

(22) Filed: Feb. 4, 2003

(65) Prior Publication Data

US 2004/0042490 A1    Mar. 4, 2004

Related U.S. Application Data

(60) Provisional application No. 60/354,405, filed on Feb. 4, 2002.

(51) Int. Cl.
*H04L 12/28* (2006.01)
(52) U.S. Cl. .................. 370/366; 370/389; 370/392; 370/466; 717/155

(58) Field of Classification Search ................ 370/366, 370/389, 392, 466, 467, 474, 476; 709/224; 717/127, 155
See application file for complete search history.

(56) References Cited

U.S. PATENT DOCUMENTS

| | | | |
|---|---|---|---|
| 6,393,019 B1 * | 5/2002 | Dobashi et al. ............. | 370/352 |
| 6,651,099 B1 * | 11/2003 | Dietz et al. ................. | 709/224 |
| 6,915,507 B1 * | 7/2005 | Kaler et al. ................. | 717/103 |
| 7,193,999 B1 * | 3/2007 | Takatori et al. ............. | 370/394 |

* cited by examiner

*Primary Examiner*—Chi Pham
*Assistant Examiner*—Shick Hom
(74) *Attorney, Agent, or Firm*—Blakely, Sokoloff, Taylor & Zafman LLP

(57) ABSTRACT

The invention provides apparatuses and methods for quickly modifying state information. Preprocessing prepares the state information to be modified. A logic unit modifies the state information. Postprocessing then puts the modified state information in proper form for output.

4 Claims, 9 Drawing Sheets

STATE RECORD PROCESSING

RELATED APPLICATIONS

This application claims priority from U.S. provisional application No. 60/354,405 filed on Feb. 4, 2002, which is incorporated by reference herein in its entirety.

BACKGROUND

1. Field of the Invention

This invention relates to network communications, and more particularly to an efficient and adaptable system for processing packets.

2. Background of the Invention

When data packets are sent through a network, the packets often must be processed or modified between their source and destination. For example, when a packet flows from a LAN (local area network) port to an MPLS (multiprotocol layer switching) port, the packet may have to be converted into an Ethernet over MPLS format, and the traffic fields in the internal header may have to be modified. Other modifications or processing may also be necessary.

State information within a packet processor stores information that is relevant to more than just a single processed packet and thus has a stored lifetime for longer than the processing of a single packet. As packets are processed, the state information. frequently is changed to reflect what occurs during processing. What is needed is a system and method for modifying state information quickly and inexpensively.

SUMMARY OF THE INVENTION

The invention employs a table and context based architecture to provide a powerful and flexible way to process packets. Each packet that arrives at a services processor is assigned a packet context that contains information about the packet, state information related to the packet, and about the actions to be done to the packet. This context identifies the next action to be taken in processing the packet. Packet processing follows a table based scheme. Action tables contain actions to be performed on the packet. Lookup tables are used in conjunction with lookup actions as branching functions to determine the next action or action table to be used in the process, among other things. State tables contain information that is stored for longer than the time one packet is processed.

Information within the state tables is often modified in real time as packets are processed. A multiple-path state information update system is used to allow multiple modifications to stored state information to be made at once. This increases the speed at which state information can be updated, so that processing of packets is not unduly delayed. Each path within the state information update system will typically include preprocessing modules that prepare a piece of state information for modification, and arithmetic logic unit for modifying the piece of state information, and postprocessing modules for placing the modified piece of state information in proper form for output.

DETAILED DESCRIPTION OF THE PREFERRED EMBODIMENTS

System Overview

Figure 1:
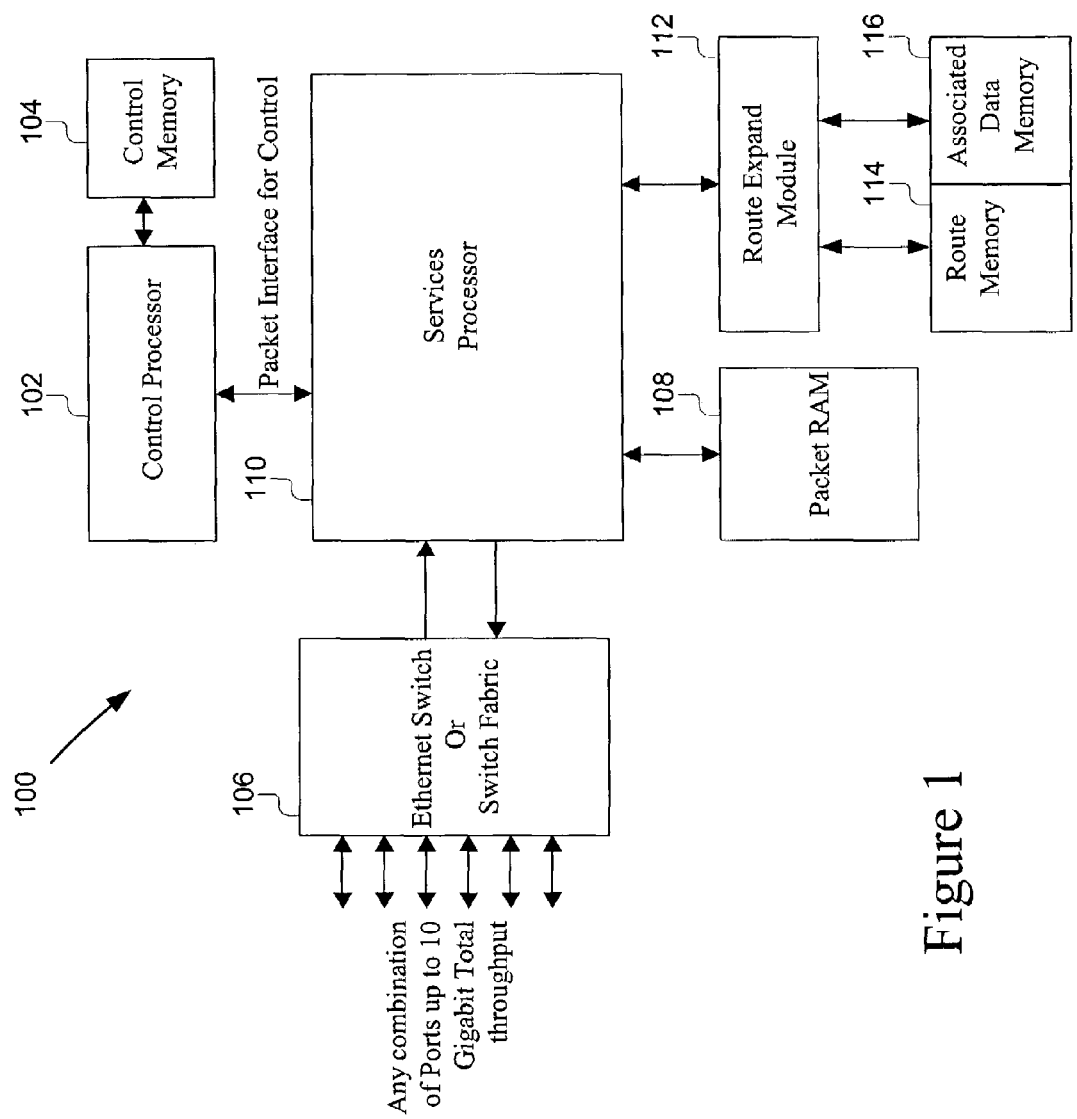
FIG. 1 is a block diagram that illustrates a 10 gigabit services processor as part of a highly integrated Ethernet MAN access switch.

Referring now to FIG. 1, an exemplary use of a full duplex, multiple port services processor 110 according to the present invention is shown. FIG. 1 illustrates the services processor 110 as part of a highly integrated Ethernet MAN access switch 100 with a 10 gigabit aggregate throughput. While present invention will be described in this context, those skilled in the art will recognize that the services processor 110 of the present invention can be designed for other data rates and has a variety of other uses including but not limited to being part of multi-service switches, metro switches, content switches, stateful firewalls, network probes enterprise routers, multi-protocol routers, Label Edge Routers (LER) and Label Switched Routers (LSR) (IP routers), wireless base stations, bandwidth managers, DSLARs and fast firewalls. As shown in FIG. 1, the Ethernet MAN access switch 100 preferably comprises a control processor 102, a control memory 104, an Ethernet switch or switch fabric 106, a packet memory 108, the services processor 110, a route expand module 112, a route memory 114, and associated data memory 116.

The control processor 102 is coupled to the services processor 110 by a packet interface and to the control memory 104 by a memory bus. The control processor 102 provides routing and switching protocol support for the services processor 110. The control processor 102 uses the packet interface for control plane functions such as configuration and event messages. Packets can also be sent to and received from the services processor 110 by the control processor 102 using the control plane. Thus, the operations and processing performed by the services processor 110 can be fully controlled using the control processor 102 and routines stored in the control memory 104.

The services processor 110 provides advanced switching functions (VPLS bridging, IP routing, fire walling, content switching including TCP termination) and feature processing (ACL and Subscriber Management) in this example. The services processor 110 is responsible for processing the packets to provide the appropriate routing and filtering as prescribed by the control processor 102. The services processor 110 is coupled to the Ethernet switch 106 for receiving and sending such packets. The services processor 110 is also coupled to the packet memory 108. The packet memory 108 is used to store packets prior to, during and after processing by the services processor 110. Finally, the services processor 110 is also coupled to the route expand module 112 that in turn is coupled to the route memory 114 and the associated data memory 116. The route expand module 112 is used to access large tables used by the services processor 110. For example, tables such as large label tables, route tables, and flow ID tables are stored in the route memory 114 and the associated data memory 116, and can be retrieved into a cache of the services processor 110 by the route expand module 112. One embodiment of this is described in patent application Ser. No. 60/402,359, filed Aug. 8, 2002, titled, "Tree Data Structure With Range-Specifying Keys and Associated Methods and Apparatuses," which is incorporated by reference.

Figure 2:
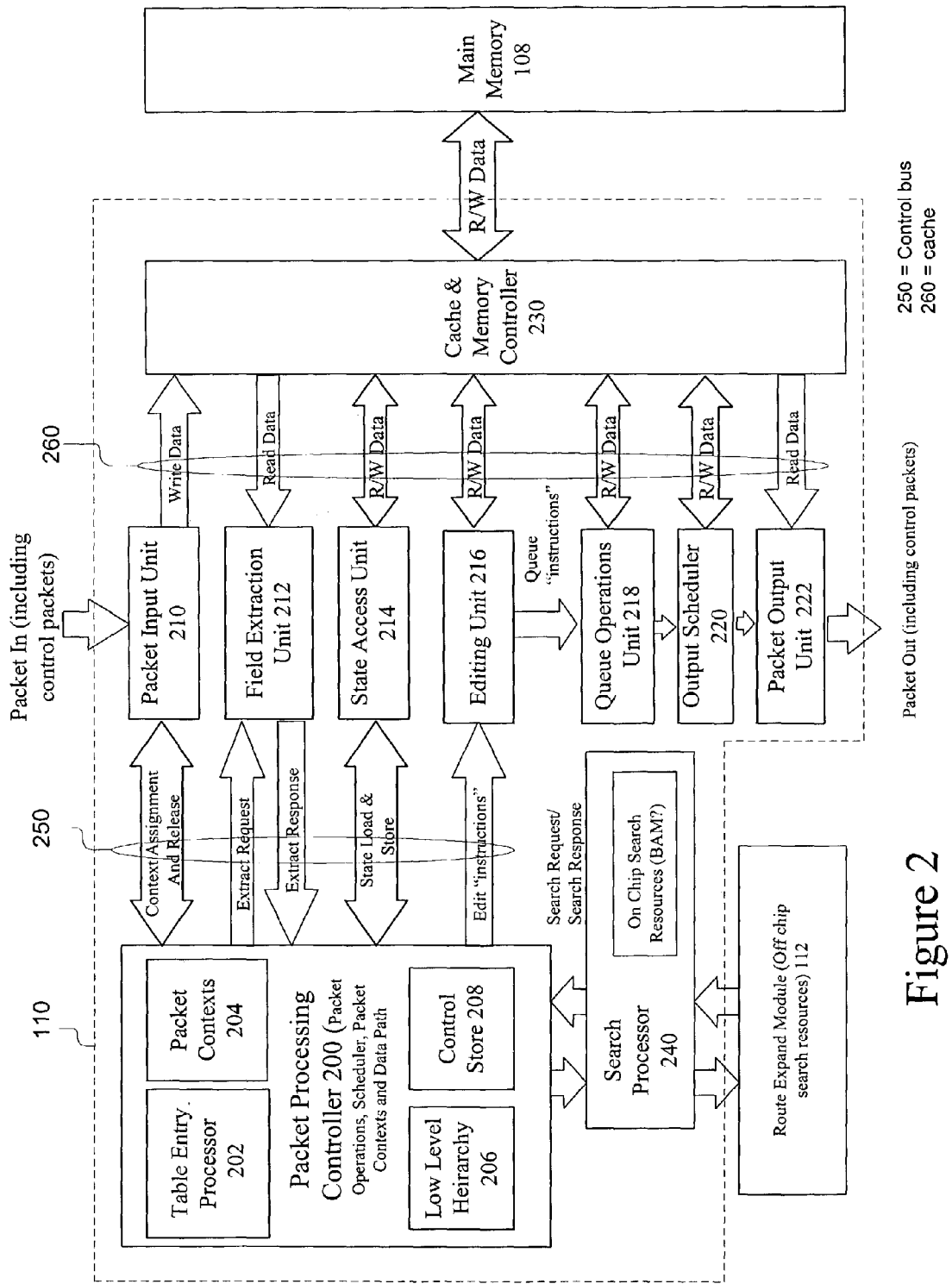
FIG. 2 is a block diagram that illustrates one embodiment for the services processor in more detail.

Referring now to FIG. 2, one embodiment for the services processor 110 is shown in more detail. Specifically, FIG. 2 shows the components of the services processor 110 and their coupling to the route expand module 112, and the main memory 104/108. In one embodiment, the services processor 110 is manufactured as a single integrated circuit with the route expand module 112, and a main memory 104/108 being separate integrated circuit chips. In the embodiment shown, the services processor 110 preferably comprises a packet processing controller 200, a packet input unit 210, a field extraction unit 212, a state access unit 214, an editing unit 216, a queue operations unit 218, an output scheduler 220, a packet output unit 222, a cache and memory controller 230, and a search processor 240. The packet processing controller 200 is coupled by a control bus 250 to the packet input unit 210, the field extraction unit 212, the state access unit 214, and the editing unit 216. The cache and memory controller 230 is coupled to the packet input unit 210, the field extraction unit 212, the state access unit 214, the editing unit 216, the queue operations unit 218, the output scheduler 220, the packet output unit 222 by a cache bus 260.

The packet processing controller 200 controls the operation of the services processor 110 in its processing and filtering of packets. The packet processing controller 200 is a control engine that controls the packet input unit 210, the field extraction unit 212, the state access unit 214, and the editing unit 216 as will be described in more detail below. The packet processing controller 200 preferably uses a table driven approach to control how packets are processed. The packet processing controller 200 preferably includes a table entry processor 202, one or more packet contexts 204 for each packet being processed, a low level hierarchy 206 and a control storage area 208. The low level hierarchy 206 and the control storage area 208 are part of the working memory of the packet processing controller 200 and provide additional areas for storing data need to process a packet.

The table entry processor 202 is part of the packet processing controller 200. The table entry processor 202 receives table entries retrieved by the packet processing controller 200, decodes the table entries, and sends commands based on the table entries to the packet processing controller 200. In response to commands by the table entry processor 202, the packet processing controller 200 issues control signals on the control bus 250 to the packet input unit 210, the field extraction unit 212, the state access unit 214, the editing unit 216, and/or issues instructions to the search processor 240. Also in response to commands by the table entry processor 202, the packet processing controller 200 stores information in the packet context 204 and retrieves information from the packet context 204. Execution of the table driven program by the table entry processor 202 makes the packet processing controller 200 effectively a table driven machine capable of processing multiple types of tables including look up tables having comparison data for searching, action tables specifying parsing and action instructions, and state tables for storing any state data that has a lifetime greater than the time required to process a single packet.

A separate packet context 204 is used by the packet processing controller 200 for each packet as that packet traverses through the packet input unit 210, the field extraction unit 212, the state access unit 214, and the editing unit 216. The packet context 204 is a register set that keeps track of information associated with a packet while that packet is being processed. The packet context 204 includes several different kinds of registers. The packet context 204 preferably includes registers that determine which tables are currently controlling packet processing (analogous to a program counter in a CPU), and where in a packet the various protocols start (Encapsulation Pointers). For example, the packet context 204 includes registers with the following functions: a next instruction register that points to the next instruction to be processed for this packet context, multiple instruction registesr are used to create an instruction stack to support action and lookup tables analogous to subroutines in a CPU; a table handle register that points to the next lookup table to be processed in this packet context; a search result register that contains the result of the last search issued; a packet handle register that points to the packet associated with this packet context; one or more encapsulation pointer registers that acts as index registers for access to data in the packet pointed to by the packet handle register; one or more edit registers used by a packet editor to assemble complex edits that are applied to the packet; one or more key registers used to assemble multi-field search keys; one or more State Record Handle Registers used to access state data and a packet/context template handle used to access a block of packet buffer memory to load multiple registers in the packet context, as the source for a create packet operation, and as the source for a add encapsulation operation.

The packet processing controller 200 is also coupled to search processor 240 to send search requests and receive search responses. The search processor 240 is coupled to and interfaces with the route expand module 112 to retrieve data stored in the memories 114, 116 associated with the route expand module 112. In one embodiment, the search processor 240 includes resources for performing searches such as a Boundary Addressable Memory (BAM). The search processor 240 can search for the next table program entry to be processed by the table entry processor 202, a result from a lookup table stored in memory as directed by the table entry processor 202, or other information. One embodiment of this BAM is described in patent application Ser. No. 10/005,986, filed Nov. 7, 2001, titled, "Boundary Addressable Memory," which is incorporated by reference.

One particular advantage of the present invention is the inclusion of the cache and memory controller 230 in the services processor 110. The cache and memory controller 230 is coupled to main memory 104/108 and the cache bus 260. The cache and memory controller 230 is preferably large enough so that many applications can execute exclusively out of cache 230. The cache and memory controller 230 effectively hides the latency of memory access to the services processor 110. The cache and memory controller 230 are designed to optimize data across the memory bus and will return data out of order from memory if necessary. The cache and memory controller 230 may also be locked to enhance performance such as to ensure that cache includes all data structure components or locking the top of the hierarchy in cache to accelerate insertions. It should be understood that both the packet data as well as other state and control information may be stored in the cache 230. If lookup tables or action table program entries are stored in cache 230 or main memory 108, a memory access unit (not shown) adapted for the type of information being retrieved will be included in the services processor 110. The packet processing controller 200 will then use the memory access unit, such as a lookup table access unit or action table access unit to retrieve results from the lookup table or retrieve action entries.

The packet input unit 210 processes the packets as the services processor 110 first receives them. The packet input unit 210 is coupled to signal line 120 to receive packets from the Ethernet switch 106. The packet input unit 210 is also coupled to the cache and memory controller 230 by the cache bus 260 for storing the packets in the cache and memory controller 230. The packet input unit 210 stores the packet data into one or more free blocks in the cache 230. The packet input unit 210 is also coupled to the packet processing controller 200 by the control bus 250. The packet input unit 210 notifies the packet processing controller 200 that a new packet is being received. As soon as the first block has been filled or an end of packet is detected, the packet processing controller 200 assigns the packet a packet context 204 and initial table handle, and the other registers in the packet context 204 are cleared. The packet context is released for further processing by the packet processing controller 200.

Once a packet is released for further processing, packet processing controller 200 performs actions in a table specified by the initial table handle. These will typically be packet parsing operations such as extracting a field from the packet and putting the field into one or more key registers to construct a key.

The field extraction unit 212 is coupled to the cache and memory controller 230 by the cache bus 260 for reading data out of cache 230 and memory 104/108. The field extraction unit 212 is also coupled to the packet processing controller 200. The field extraction unit 212 is responsive to extract requests from the packet processing controller 200 and sends extract responses for further processing by the packet processing controller 200. The function of the field extraction unit 212 is to retrieve packet data from the cache, extract the portions of packets referenced or addressed by extract requests, and return the extracted data to the packet processing controller 200. If the packet processing controller 200 requests packet data from a portion of the packet that has not yet been stored in cache the processing of the requesting packet context will be suspended until the data is received.

The state access unit 214 processes state load and store requests from the packet processing controller 200. The state access unit 214 is coupled to the cache and memory controller 230 by the cache bus 260 for reading and writing data into and out of cache 230. The state access unit 214 is also coupled to the packet processing controller 200 to receive state change commands. More particularly, each packet context 204 preferably has a plurality of state registers and the packet processing controller 200 may maintain state tables. The data in the state tables is modifiable as is the data in the state registers. The state access unit 214 increases the processing throughput by retrieving the state information, updating and maintaining state data table information in response to instructions from the packet processing controller 200.

One particular advantage of the services processor 110 of the present invention is the ability to edit packets before they are output. The editing unit 216 is responsible for packet editing performed by the services processor 110. The editing unit 216 is coupled to the packet processing controller 200 and responsive to edit instructions received from the packet processing controller 200. The editing unit 216 is also coupled to the cache 230 to read and write data including packet data. For example, the editing unit 216 performs a variety of packet modification functions such as: inserting data in a packet, deleting data from a packet, overwriting data in a packet, adding or subtracting a constant, another piece of packet data or register value from data in a packet, recalculating checksums in a packet, performing hashing operations on fields in a packet, packet creation, packet replication, packet segmentation, and packet re-assembly. More specifically, exemplary packet modification operations that occur as part of the output process include: 1) Drop Packet—The drop packet instruction recycles the buffers used for the packet; 2) Output Packet—The output packet instruction causes the edit process to apply all accumulated edits and send it to the queue specified by the queue handle in the output instructions user data component; 3) Sync Edits—The sync edits instruction causes the edit process to apply all accumulated edits and sends it to the head of the input overflow queue; 4) Copy and edit—The copy and edit instruction creates a copy of the packet and sends it to the head of the input overflow queue, and cause the edit process to apply all accumulated edits and send it to the queue specified by the queue handle in the output instructions user data component; 5) Edit and copy—The edit and copy instruction causes the edit process to apply all accumulated edits and sends it to the queue specified by the queue handle in the output instructions user data component and creates a copy of the packet and send it to the head of the input overflow queue; and 6) Copy and Output—The copy and output instruction creates a copy of the packet, causes the edit process to apply all accumulated edits and sends it to the queue specified by the queue handle in the output instructions user data component. Once all packet editing has been performed on a particular packet, a queue instruction output by the editing unit 216 to the queue operations unit 218.

The queue operations unit 218 handles the ordering of packets before they are output. The services processor 210 groups or orders the packets into queues for output. The queues are preferably maintained in cache 230 and include a queue control block and link lists of packets. The queue operations unit 218 is coupled to receive queue instructions once the editing unit 216 has processed the packets. The queue operations unit 218 also has the capability to re-order packet for outputting. This helps ensure that the packets are output in the order received. The queue operations unit 218 is coupled to the cache 230 to prepare the data for output and maintain the queues in the cache 230. The operations unit 218 also manages the length of each queue to shape traffic responsive to queue instructions.

Sometime after the packets have been added to a queue by the queue operations unit 218, the output scheduler 220 removes them and sends them to packet output unit 222. The output scheduler 220 is coupled to read and write data from the cache 230. The output scheduler 220 preferably uses a hybrid list/calendar queue to determine the priority for outputting the packets. Transmit shaping is accomplished by associating a group of queues with a scheduler. When a queue is associated to a scheduler its scheduling parameters are initialized. The output scheduler 220 supports multiple scheduling algorithms including: a prioritized scheduler where the scheduler serves the queues in strict priority order; a weighted fair scheduler where scheduler serves the queues in proportion to their weight; a dual token bucket scheduler; a rate limited scheduler; or a Earliest Deadline First (EDF) scheduler. Once scheduled, the packet output unit 222 retrieves the packets from cache and outputs then from the services processor 110. The packet output unit 222 is coupled to the cache 230 by the cache bus 260 and has its output coupled by signal line 122 to the Ethernet switch 106.

Packet Context

Figure 3:
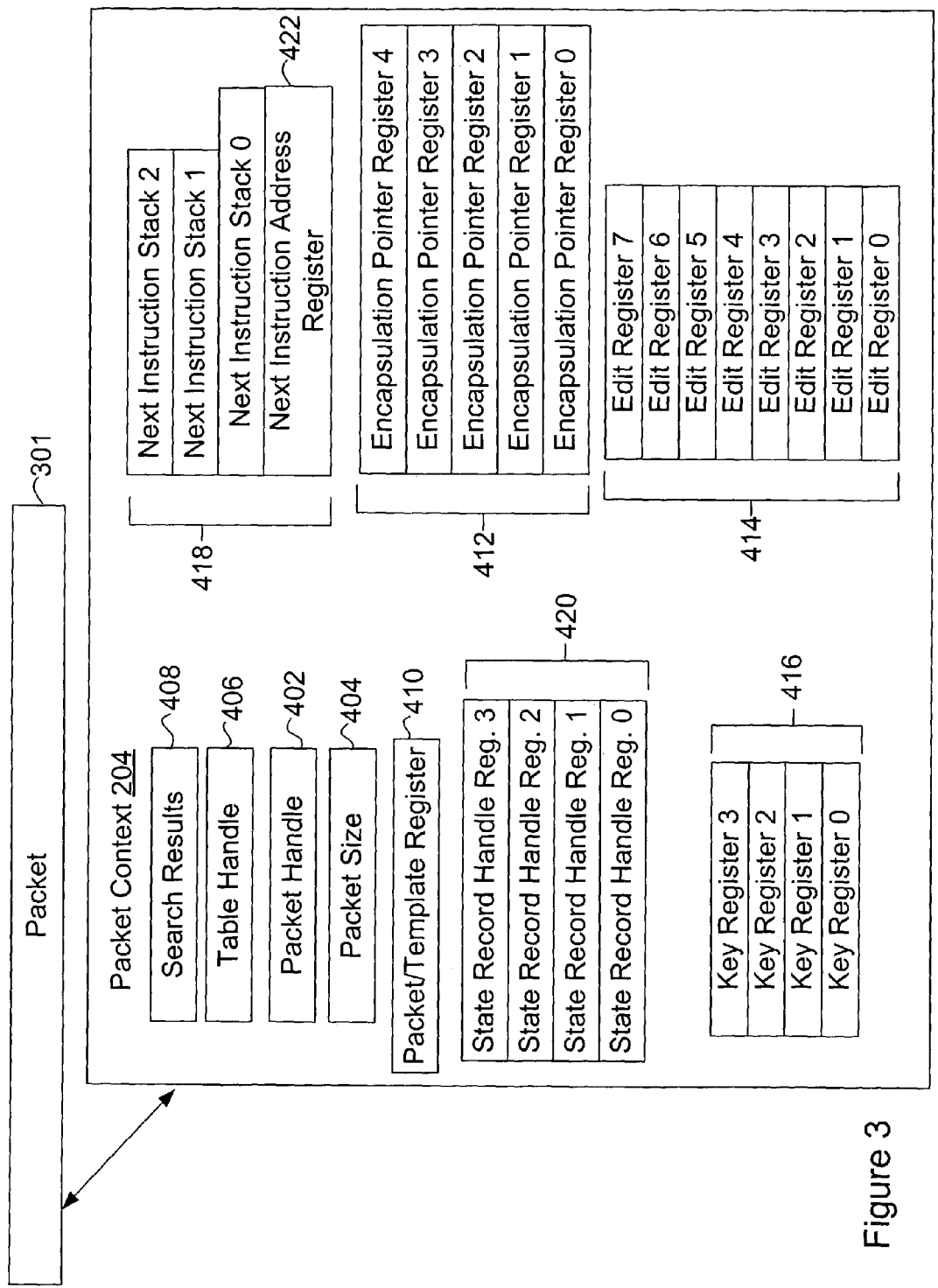
FIG. 3 is a block diagram that illustrates a packet and the packet context associated with that particular packet.

FIG. 3 is a block diagram that illustrates a packet 301 and the packet context 204 associated with that particular packet 301. When the packet 301 is first received the services processor 110, it is received by the packet input unit 210, which stores packet data into one or more free blocks in the cache 230. Control is then passed to the packet processing controller 200. To aid in processing, the packet processing controller 200 then initiates assignment of a packet context 204 to each received packet 301. In one embodiment, the packet context 204 is assigned to each packet 301 as soon has the packet fills the first block in cache 230 or the end of the packet 301 is detected. Each packet context 204 contains several different sets of registers for storing data related to the packet 301.

In these different sets of registers, the packet context 204 stores information related to a packet 301 and information used in processing of that packet 301 while that particular packet 301 is being processed. The packet context 204 is similar to a thread control in a processor in that the packet context 204 keeps track of the packet 301, what is being done to the packet 301, and what will be done to the packet 301. There is a separate packet context 204 for each packet 301 being processed by the services processor 110. In one embodiment, there are 256 packet contexts 204 in the services processor 110. This provides the services processor 110 with enough sets of packet context 204 registers to keep track of every packet 301 being processed. Other embodiments may have more or less packet contexts 204. When processing for a particular packet 301 is finished, the packet context 204 can be cleared and used for a new incoming packet 301.When a packet is received and there is no available packet context to assign to the packet, the packet will be placed in an input overflow queue. Packets in the input overflow queue can have higher, equal or lower priority than new input packets for packet context assignment.

What follows is a description of the information stored in a packet context 204 for each packet 301 in one embodiment of the present invention. In other embodiments, more, less, or different information can be stored in a packet context 204.

The packet context 204 includes information about the packet 301 itself. A packet handle register 402 stores a pointer to the location in memory of the packet 301 to which this packet context 204 relates. A packet size register 404 stores the size of the packet 301 to which this packet context 204 relates. In the case where packet processing starts as soon as the first cache block is full, the size of the packet may not be known when processing starts. In this case logic in the packet processing controller 200 and associated with the packet size register will detect references to the packet size before it becomes valid. If such an access occurs the processing of the packet will be suspended until the size is known.

A table handle register 406 stores a pointer to a lookup table that will be used next during packet processing. A search results register 408 stores the information returned from the last use of a lookup table.

A packet/template handle register 410 stores a pointer to another packet or to a template in memory. The packet/template handle register 410 will store a pointer to another packet in memory when, for example, an action that involves two packets is to be performed. One such example is when a concatenation of the packet 301 to which the packet context relates with another packet is performed. In one such an example, the packet handle register 402 stores a pointer that points to a first packet with a first header and a first payload. The packet/template handle register stores a pointer that points to a second packet with a second header and a second payload. The next instruction address register 422 stores a pointer to an action that, when processed by the table entry processor 202, causes the payload of the second packet to be added on to the payload of the first packet, resulting in the packet having the header and a payload that includes both the first and second payloads. This capability can be used in conjunction with other editing operations to perform complex packet editing operations such as IP re-assembly. The packet/template register 410 can also store a pointer to a template stored in memory. This is useful, for example, when the packet 301 is of a known type. All the information common to that type of packet can then be retrieved from the template rather than from the packet 301 itself. This can improve efficiency in gathering information about a packet 301.

Encapsulation pointer registers 412 store encapsulation pointers that point to locations within the packet 301. Encapsulation pointer registers 412 are used to create encapsulation relative addresses within the packet 301. The first encapsulation pointer register 412, encapsulation pointer register 0, has a value of 0 and points to the beginning of the packet 301. The other encapsulation pointer registers 412 point to other arbitrarily defined locations within the packet. In the illustrated embodiment, there are five encapsulation pointer registers 412, although in other embodiments there may be more or fewer of these registers.

The encapsulation pointers are used for simplified packet data accesses. In one embodiment, encapsulation pointer registers 412 are 16 bits, which allowable access to 64 kB packets. Typically, the different encapsulation pointer registers 412 point to the start of various protocols found within a packet. For example, if the packet 301 is in Ethernet packet, encapsulation pointer register 0 points to the start of the Ethernet header. Encapsulation pointer register 1 could point to the start of an MPLS label stack, encapsulation pointer register 2 to the start of an IP header, and encapsulation pointer register 3 to the start of a TCP header. These encapsulation pointer registers 412 make it easy to create relative addresses, for example eight bits into the TCP header, and simplifies programming.

Figure 4:
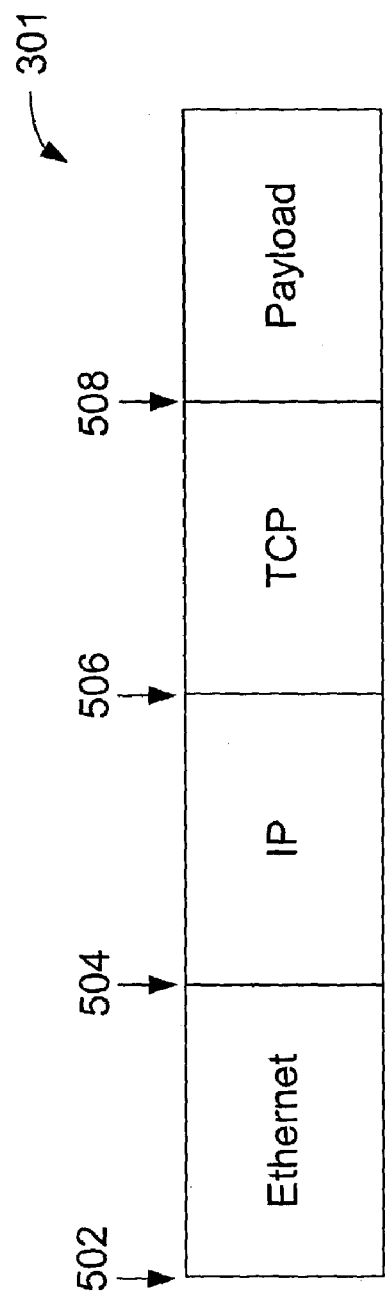
FIG. 4 is a block diagram that illustrates an exemplary packet and the location within the packet to which the encapsulation pointers point.

FIG. 4 is a block diagram that illustrates an examplary packet 301 and the location within the packet 301 to which the encapsulation pointers point. Encapsulation pointer 0

502 points to the beginning of the packet 301. Encapsulation pointer 1 504 points to the beginning of the IP header, encapsulation pointer 2 506 points to the beginning of the TCP header, and encapsulation pointer 3 508 points to the beginning of the packet payload. The programming environment or Application Programming Interface (API) for the packet processing controller 200 allows a symbolic name to be associated with each encapsulation pointer. For example, in FIG. 4, a programmer may use the symbolic name "packet" to indicate encapsulation pointer 0 502, which points to the beginning of the packet 301. Similarly, a programmer may use the symbolic name "IP" to indicate encapsulation pointer 1 504, which points to the beginning of the IP header. Thus, a programmer need not know the location within the packet 301 of different fields, instead simply using the symbolic names. The symbolic names allow relative addressing as well. The programmer may specify a location relative to a symbolic name, such as the second byte of the IP header.

Figure 5:
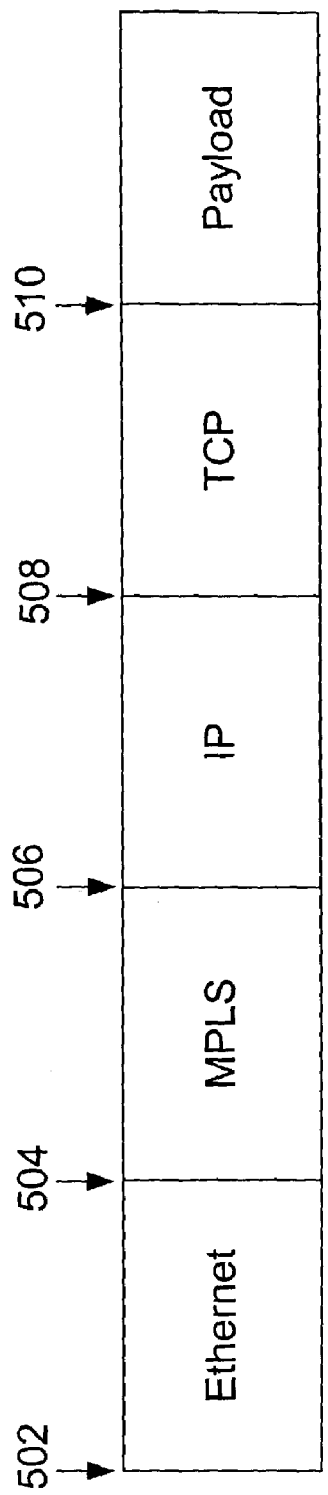
FIG. 5 is a block diagram that illustrates the packet after editing, and the locations within the edited packet to which the encapsulation pointers point.

FIG. 5 is a block diagram that illustrates the packet after editing 512, and the locations within the edited packet 512 to which the encapsulation pointers 502-508 point. In FIG. 5 the editing operation added an MPLS field to the packet 301. After editing, encapsulation pointer 0 502 still points to the beginning of the packet 512, but the other encapsulation pointers 504-508 no longer point to the same locations in the packet. Encapsulation pointer 1 504 points to the beginning of the MPLS field, encapsulation pointer 2 506 points to the beginning of the IP header, encapsulation pointer 3 508 points to the beginning of the TCP header, and a new encapsulation pointer 4 510 points to the beginning of the payload. However, the API for the packet processing controller 200 modifies the symbolic names so that after the edit operation, the symbolic names still relate to the same fields in the packet 512. Thus, the symbolic name "packet" still indicates encapsulation pointer 0 502. However, the symbolic name "IP" indicates encapsulation pointer 2 506, rather than encapsulation pointer 1 504. When a new field is added, and the encapsulation pointers change, the symbolic names are changed as well so that each symbolic name still points to the same header or field within the edited packet 512 as it did before the edit. This simplifies the programming since programs can manipulate protocol data such as the Checksum field in the IP header.

Returning back to FIG. 3, the packet context 204 also includes a set of edit registers 414. When an action table indicates that an edit operation should be performed on the packet 301, that edit operation to be performed is stored in one of the edit registers 414. When control is passed to the editing unit 216, all of the edits stored in the edit registers 414 are performed on the packet 301. The edits are stored in the edit registers 414 based on where in the packet the edits will be applied. For example, edit register 0 contains the edit to be applied to the information in the packet 301 that is stored closest to the beginning of the packet 301. Edit register 1 contains the edit to be applied next closest to the beginning of the packet 301, and an edit stored in edit register 7 is applied nearest to the end of the packet 301.

Figure 6:
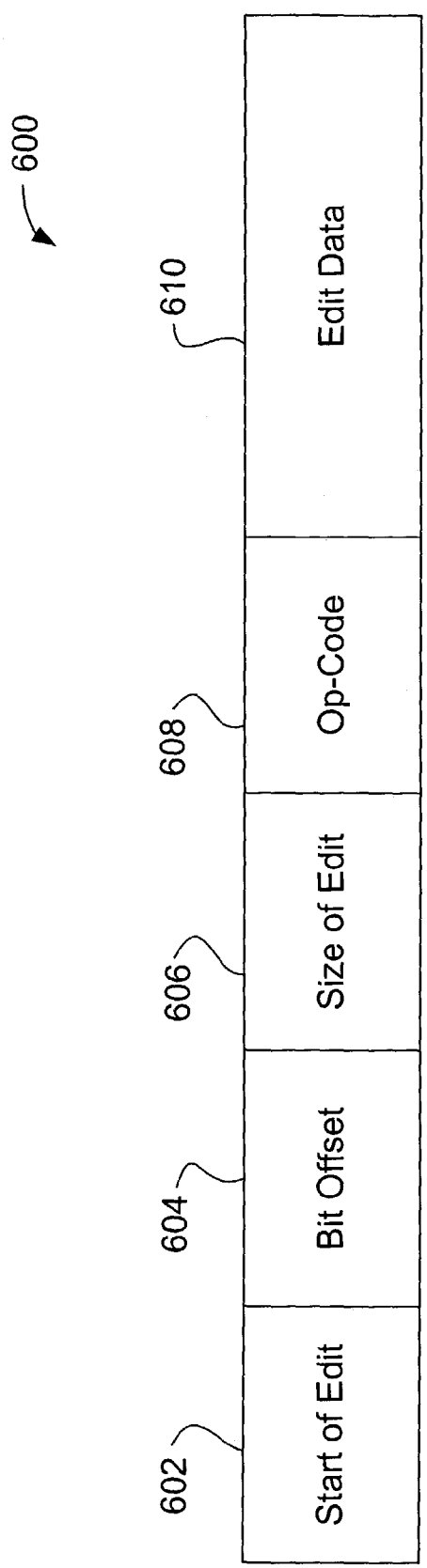
FIG. 6 is a block diagram that illustrates the information stored in the edit register in one embodiment of the present invention.

FIG. 6 is a block diagram that illustrates the information stored in the edit register 414 in one embodiment of the present invention. The first field 602 is a packet absolute address of the first byte that will be modified by the edit. This determines in which edit register 414 this edit will be stored. The second field 604 is a bit offset that specifies the offset of the first bit within the specified byte to be modified. The third field 606 is the number of bits that will be modified by the edit. The fourth field 608 is a code that specifies which editing operation will be performed. Examples of possible editing operations include: an insert operation, an override operation, a delete operation, and a checksum operation. The fifth field 610 stores data used in the edit operation. For example, if the edit operation is to insert data, the fifth field 610 stores the data to be inserted into the packet. Information from the second through fifth fields 604-610 is stored in the appropriate edit register 414.

Returning again to FIG. 3, the packet context 204 also includes a set of key registers 416. The key registers 416 store data used as keys. For example, one use of these keys is when a lookup operation is performed with a lookup table. The keys can be used in other ways as well. In one embodiment, each key register 416 includes a length field that specifies the number of bits the key register 416 contains, and a key field that contains the key itself. In the illustrated embodiment, there are four key registers 416, although other numbers of key registers 416 can also be used in different embodiments. Parsing actions can store multiple fields in a single key register 416 to allow multiple field lookups. Examples of these multiple field lookups include the Cisco n-tuple, Destination Address/Diff Serve Code Point (DA/DSCP), and the IP fragment (IP SA/Packet ID) table lookups.

The packet context 204 also includes a set of registers used as an instruction stack, known as next instruction registers 418. The first register of the next instruction registers 418 is known as the next instruction address register 422. This next instruction address register 422 stores the location of the next instruction to be executed by the packet processing controller 200 and effectively serves as a program counter. The rest of the registers of the next instruction registers 418 make up a next instruction stack. Providing a stack of next instruction registers allows implementation of subtables, similar to subroutines. When a first table (a primary table) calls another table (a subtable), the next instruction address register 422 identifies the next instruction in the subtable, and the next instruction stack identifies the next instruction in the primary table. This allows a process to return to the correct point in the primary table once execution of the instructions in a sub table have been completed.

Finally, the packet context 204 includes a set of state record handle registers 420. State records contain data that the services processor 110 stores for longer than the duration of the processing of one packet within the services processor 110. For example, state records can store information about a TCP session. A TCP session will span many packets, and be related to all the packets that make up that session. If a packet to which the packet context 204 relates is part of a TCP session, it is typically desirable to update a TCP state record with information about that packet. The state record handle registers 420 provide a link to the state records related to that packet so that information may be retrieved from the state record, or the state record may be modified as required. In one embodiment, the state record handle registers 420 can be loaded from the data extracted from the packet 301 in a parsing operation, from the return value of a lookup operation, or from other operations.

Table Driven Packet Processing and Tables

Figure 7:
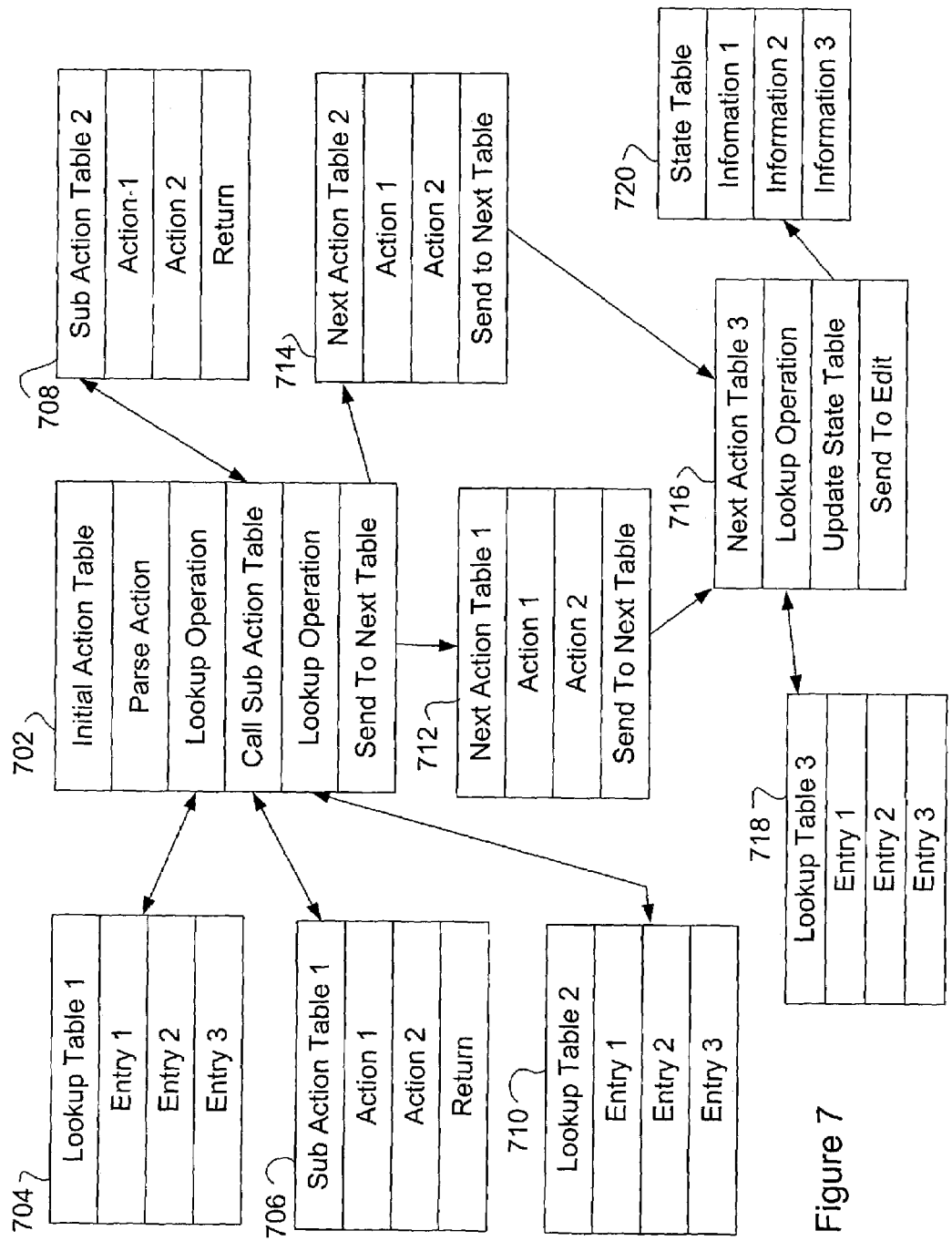
FIG. 7 is a block diagram that illustrates action tables, lookup tables, and state tables, and how these table types are used by the packet processing controller.

In one embodiment of the present invention, there are two primary types of tables used by the services processor 110 to process a packet: lookup tables and action tables. A third table type, a state table, may also be used or modified during packet processing. FIG. 7 is a block diagram that illustrates an exemplary table based program, the action tables, lookup tables, and state tables used by the program, and how these table types are used by the packet processing controller 200 in the services processor 110 to process a packet 301 according to the table based program. The example of FIG. 7 is a simple descriptive overview of one example of how a packet 301 can be processed. The present invention allows a programmer to specify how a particular packet 301 is processed by specifying the tables used in a table based program and/or creating tables. Thus, actual processing performed on the given packet 301 may be different in substance and/or complexity from the example described.

The packets 301 are processed using a table based processing scheme. After assignment of the packet context 204, the packet 301 is assigned an initial action table 702 by the services processor packet processing controller 200. This is done by storing the location of the first instruction in the initial action table 702 in the next instruction address register 422 in the packet context 204. In one embodiment, the other registers in the packet context 204 are cleared at this time. The location of the first instruction in the initial action table 702 may be determined by the port through which the packet 301 arrived, for example, so that a packet arriving from a set port will have a set initial action. Other schemes for determining the location of the first instruction in the initial action table 702 may also be used. The initial action table 702, as well as other action tables, are tables that contains linked lists of one or more actions to be taken to process the packet 301. Actions identified by the action tables can include packet parsing operations, edits that specify editing operations to be done to the packet 301, search operations, and other operations.

Figure 8:
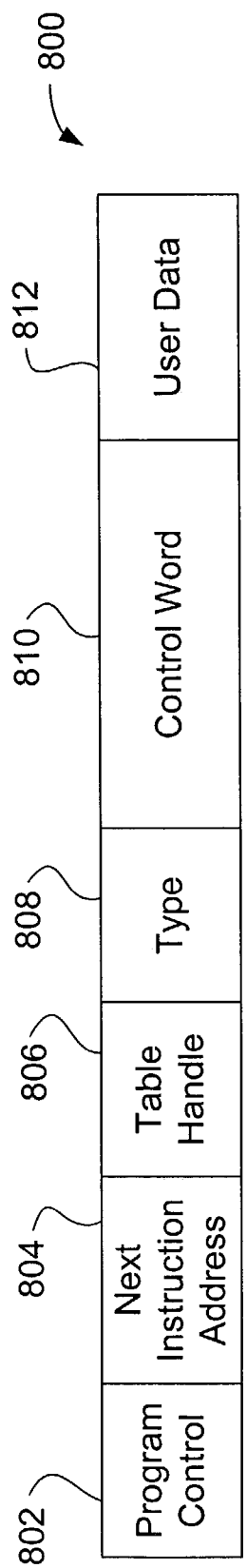
FIG. 8 is a block diagram that illustrates an example action entry of an action table according to one embodiment of the present invention.

FIG. 8 is a block diagram that illustrates an example action entry 800 of an action table according to one embodiment of the present invention. One or more of these action entries 800 linked together make up each action table. The action 800 includes a program control field 802, a next instruction address field 804, a table handle field 806, a type field 808, a control word field 810, and a user data field 812. The program control field 802 may indicate that the process should continue, that a call should be made to another process or action table, or that this current action table is complete and the process should return to a higher level table. The next instruction address field 804 contains the address in memory for the next instruction in this action table to be executed. The table entry processor 202 decodes the next instruction address field 804 and sends a command to the packet processing controller 200 to store the next instruction address field 804 in the next instruction address register 422 of the packet context 204. The next instruction address field 804 and allows action tables to be stored as logical tables, with each action pointing to the location in memory of the next action.

The table handle field 806 allows the use of subtables. If an address of an action table or a lookup table is in the table handle field 806, and the program control field 802 is a call to another table, the table referenced in the table handle field 806 will be used as a subtable. If the sub table is a lookup table, information from the table handle field 806 will be stored in the table handle register 406 of the packet context 204. If the subtable is an action table, information from the table handle field 806 will be stored in the next instruction address register 422 of the packet context 204. When the information from the table handle field 806 is stored in the next instruction address register 422, the next instruction address from the next instruction address field 804 is "pushed" to the next instruction register in the next instruction stack 418 of the packet context 204. This allows the packet context 204 to keep track of the next instruction to be performed in the table while any actions or operations specified in the subtables are performed. When a sequence of instructions in the called subtable ends with a return action, the return will "pop" the instruction address stack 418 so that the information in next instruction stack 0 gets moved to the next instruction address register 422. This allows the packet processing controller 200 to return to the correct spot within the first table from which the subtable was called. Since there are multiple next instruction stack registers, subtables may also call further subtables.

The type field 808 indicates what type of action is to be taken. Examples of types include a parsing operation, a modification operation, and a search operation that uses one or more of the keys stored in the key registers 416 of the packet context 204. The control word field 810 contains the control word that tells the packet processing controller 200 which operation to execute. The format of the control word in the control word field 810 will depend on what type of action is to be taken. Finally, a user data field 812 contains programmer-specified information related to the action that can be used by the packet processing controller 200, the editing unit 216, or other components during processing of the packet. For example, if the action is to add a tag to a packet, the user data may contain the information that makes up the tag and is added to the packet when the tag is added. The user data field 812 may also specify information to be loaded into a state record handle register 420.

Returning to FIG. 7, the packet processing controller 200 retrieves the first action to be performed from the location specified in the next instruction address register 422 and sends it to the table entry processor 202. Next, the table entry processor 202 decodes the initial action and sends instructions to the packet processing controller 200 to perform the initial action specified by the initial action table 702. In the example shown in FIG. 7, the initial action is a packet parsing operation that extracts a field from the packet 301 and constructs a key from the extracted field, although other initial actions could also be specified by the initial action table 702. To extract the field from the packet, the table entry processor 202 send a command to the packet processing controller 200, which in response requests that the field extraction unit 212 extract a field from the packet 301 and send that field to the packet processing controller 200. Next, the table entry processor 202 constructs a key from the extracted packet field. This key is passed to the packet processing controller 200, which stores the key in the packet context 204. Note that, while the description and illustration only uses one entry in the initial action table 702 to extract the field and construct a key, in some embodiments, it may take multiple actions in the initial action table 702 to perform the field extraction and key construction operations.

Figure 9:
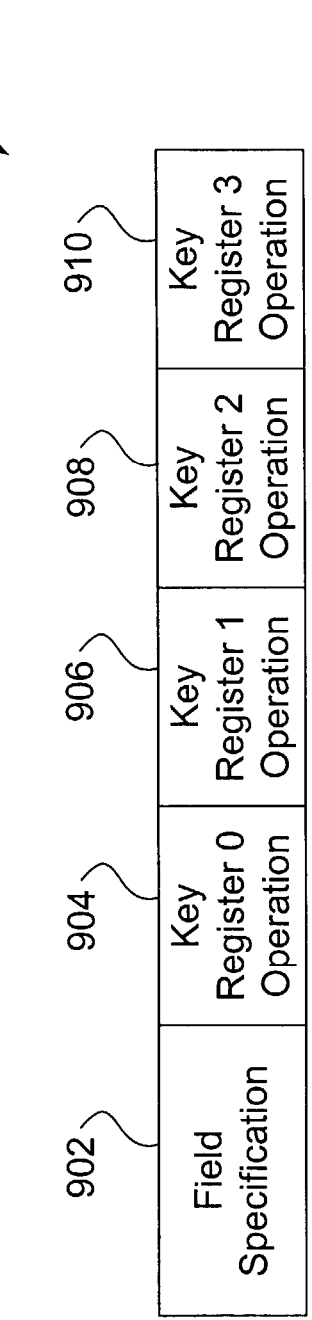
FIG. 9 is a block diagram that illustrates the information in the control word field of a parsing action entry according to one embodiment of the present invention.

FIG. 9 is a block diagram that illustrates the information in the control word field 810 of a parsing action entry according to one embodiment of the present invention. The parsing action extracts information from the packet 301 and constructs a key using this information. The field specification 902 of the parsing instruction includes a specification of a source for input data, which is typically a location in the packet, and the bit length of the information to be extracted. The key register operations 904-910 specify what operations are to be performed on the various key registers 416 of the packet context 204. In one embodiment, the operations that can be performed on the key registers are a "non op" that does nothing to the key registers 416, a load key register operation that places input dates in the key registers 416, a shift and load key register operation that shifts the contents of the key registers 416 and places additional bits to the location within the key register 416 from which the previous information was shifted, and a hash key register operation that uses a hash function on the information already in the key register 416 as well as the new input information to come up with a new key.

Returning to FIG. 7, the next operation in the initial action table 702 is a lookup operation. In a lookup operation, the table entry processor 202 uses a key from the key registers 416 in conjunction with the search processor 240 or memory access unit to search the lookup table 704 specified by the lookup operation action and return information. Lookup tables have entries that store comparand and search result data. A lookup table 704 includes a match type/default rule that defines the match operation performed by the table and a search result for a no match condition, and can also include one or more classification or match rules rules. The lookup table 704 may be searched by the search processor 240 under command from the table entry processor 202, or may be searched by a memory access unit (not shown) under command from the table entry processor 202 if the lookup table is stored in cache 230 or main memory 108. Typically, the information returned from the lookup table is a value and a pointer. The value could be an argument to be used in an action, information used to edit the packet, or other information. The pointer typically points to the next action to be performed.

In the embodiment illustrated in FIG. 7, the information returned from the lookup table 704 includes an identification of an action subtable that is to be called next by the initial action table 702. In this example, the lookup operation is used to determine which of two different action subtables 706 and 708 are to be called by the initial action table 702. Thus, the information extracted from the packet was used to construct a key used with a lookup table 704 to determine which action subtable 706, 708 is called. Different sub action tables 706, 708 will be called depending on the information within the packet.

When an action subtable 706, 708 is called, the table entry processor 202 causes a pointer to the first action in the sub action table 706, 708 to be stored in the next instruction address register 422 of the packet context 204, and "pushes" the pointer to the next action in the initial action table 702 up into the next instruction stack 418 of the packet context 204. Then, the actions in the called sub action table 706, 708 are executed by the table entry processor 202. The last action in each sub action table 706, 708 is a return to the initial action table 702. The act of returning from the sub action table 706, 708 causes the pointer from the next instruction stack 418 in the packet context to be "popped" into the next instruction address register 422 by the table entry processor 202. This allows the next action in the initial action table 702 to be executed in its correct order.

As described above, the different values returned from the lookup table 704 allow a branching function, so that any one of multiple sub action tables 706, 708 may be called. Further, since a sub action table is called, the actions in the sub action table are executed, and then the process returns to the initial action table, the sub action tables act as subroutines. While each illustrated sub action table 706, 708 simply specifies multiple actions to be executed linearly and then return to the initial action table 702, more complex arrangements can also be used. For example, a sub action table 706, 708 can specify lookup operations, make a call to another sub action table, or perform other operations.

The next action in the initial action table 702 is another lookup operation using a second lookup table 710. The key used in this lookup operation may have been generated by one of the actions in one of the sub action tables, may have been generated by another parsing action and extracting more information from the packet 301, or through another operation. This key is used with the second lookup table 710 to return information identifying a next action table to be used after the initial action table 702. Thus, this lookup operation action acts as another branch operation.

In the example illustrated in FIG. 7, there are two possible next action tables 712, 714 that can be called. The actions identified in whatever next action table 712, 714 was called are executed in order. For example, the actions in the action tables 712, 714 may specify multiple edits to be performed on the packet 301. In this case, the table entry processor 202 decodes the edits to be performed, and sends a command to the packet processing controller 200 to store the edits to be performed in the edit registers 414 of the packet context 204 for that packet 301. In the illustrated embodiment, neither next action table 712, 714 has a branch, and the final action in both of the next action tables 712, 714 include a pointer the same third next action table 716.

Since both of the next action tables 712, 714 end with a pointer to the third next action table 716, the possible branches that occurred with tables 712 and 714 have rejoined, so that no matter which of the first set of next action tables 712, 714 was executed, the same third next action table 716 is executed next. Such divergence and convergence of process flow is possible throughout the process, depending on how the tables have been programmed by the programmer. In some cases, divergence may occur without convergence, for example, or other process flows may be programmed.

The third next action table 716 includes a lookup operation. In this described example, a packet parsing operation is first performed and the destination address of the packet 301 is used as a key. The value returned from the lookup table 718 is the port in the switch from which the packet 301 will be sent after processing. After the lookup operation, the third next action table 716 specifies an "update state" action. This action updates the information stored in a state table 720. State tables store information that is useful for more than the lifetime of one packet. In this case, the state table 720 stores information about the ports of the switch 106. One or more of the information fields in the state table 720 stores the number of packets that have been sent from each output port. When a packet 301 is to be sent out through particular output port, the state table 720 is updated to reflect that another packet has been sent from that port. Other types of state tables that may be useful and updated during packet processing include TCP session state tables that store information about a TCP session of which the packet being processed is a part. The records in a state table may be arbitrarily defined by a programmer.

The packet processing is then terminated by a "send to edit" action that passes processing control to the editing unit 216 to apply the editing operations specified by previous actions and stored in the edit registers 414 of the packet context 204. The editing unit 216 then sends the edited packet 301 to the queue operations unit 218 to be queued for output. A programmer can also specify other actions to terminate packet processing. For example, the process can be terminated by an action that drops the packet, an action that passes control to the editing unit 216 to apply the specified editing operations and then returns control to the packet processing controller 200 for further actions to be done on the packet 301, or another action that terminates the process.

State Record Processing

In one embodiment, state records are 32 bytes long, and a state table can have one or more state records. Objects within a state record may be 64, 32, 16, or 8 bits long. 32- and 64- bit objects are aligned with 32 bit boundaries within the state record, 16 bit objects are aligned on 16 bit boundaries, and 8 bit objects are placed anywhere in a state record. The programmer is responsible for controlling the alignment and packing of the state objects within the state records. The state records support signed and unsigned integers, and statistics. In other embodiments, state records can have other lengths with different sized objects. The objects may be placed differently within the state records, and support for different types of information may be included.

In another embodiment, the size of the state record is chosen to fit in a single cache line in the main memory 104/108 system of the services processor 200. Frequently accessed state records containing data such as port statistics will have a high probability of being in cache 230. Additionally, the striping of the buffer data structure across RLDRAM banks, out of order access capability, and caching will interact such that when many cache misses occur the bank accesses to the RLDRAM will occur in an order that eliminates the same bank access penalty at the cost of an increase in access latency. The cache miss will result in a stall of the packet context. The large number of packet contexts will avoid significant performance impact due to the cache miss stalls.

The state access unit 214 is also known as a state processing unit 214 and functions to add, remove, or modify information in state records in the state tables. The operations that the state access unit 214 performs include increment, decrement, add, subtract, and hash. Other operations may be supported in other embodiments. When an operation results in an overflow, two types of overflow may occur. If the state record is a statistic, a "sticky" overflow occurs, where any operation that results in an overflow produces and all ones results. For a normal arithmetic overflow that occurs with integers, a wraparound overflow occurs. Other types of overflow may also be supported in other embodiments.

Typically, an action entry 800 is what prompts a modification to a state record. State record handles that point to the state objects of a state record to be modified are loaded into and stored in the state record handle registers 420 of the packet context 204. The state record handles may be loaded from the user data field 812 in an action entry 800, from information extracted from the packet 301, from the value returned as a result of a lookup operation using a lookup table, or from other sources. The same or a different action entry 800 then causes the table entry processor to cause the packet processing controller 200 to send a command to the state access unit 214 to modify a state record. The fields 802-812 of the action entry 800 also provide the information that specifies how the state record will be modified.

Figure 10:
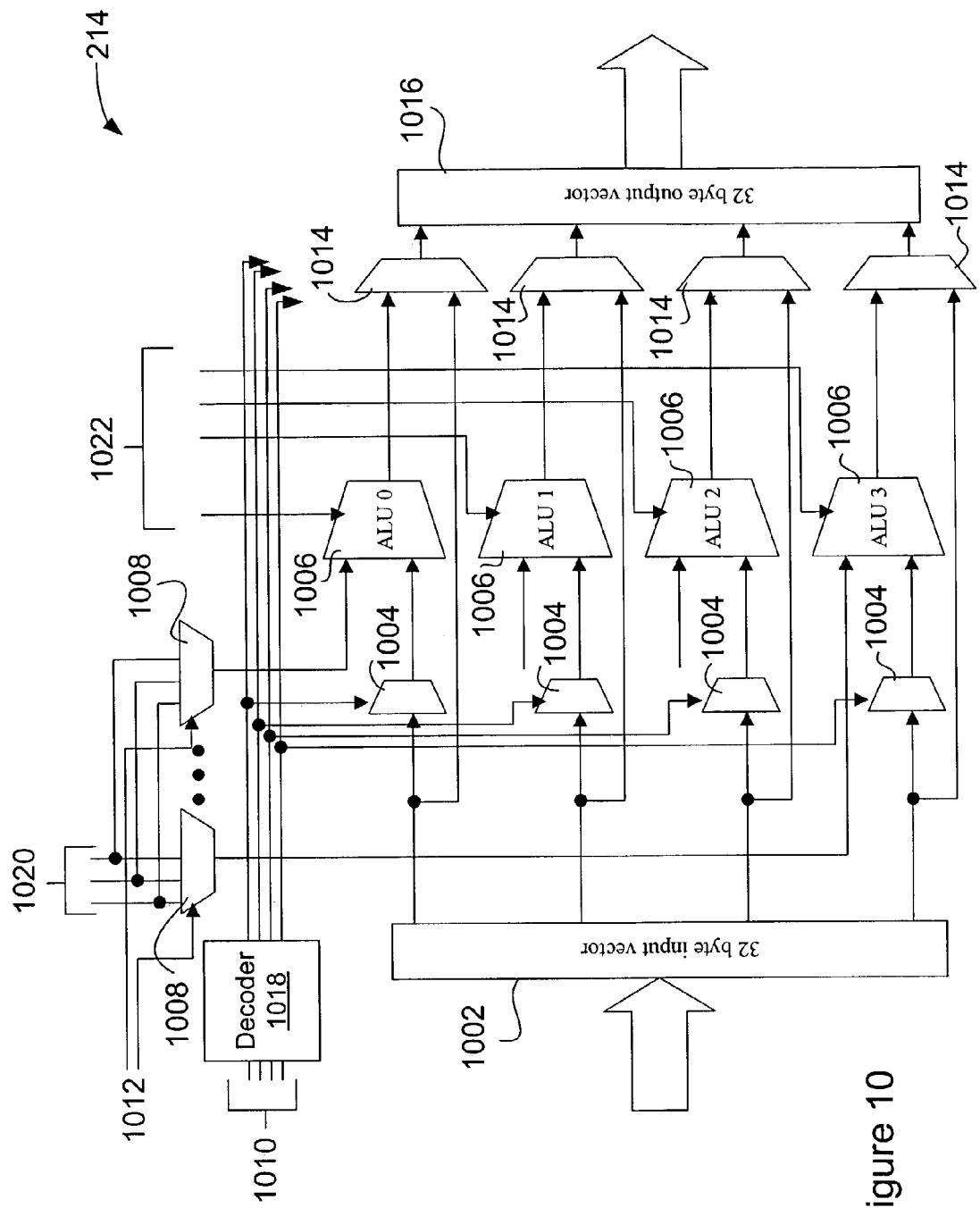
FIG. 10 is a block diagram that illustrates the state access unit in more detail according to one embodiment of the present invention.

FIG. 10 is a block diagram that illustrates the state access unit 214 in more detail according to one embodiment of the present invention. One embodiment of the services processor 110 includes a state processing unit 214 that can make four changes to a state record 1002 at once, the changes being made to the objects within the state record identified by the information stored in the four state record handle registers 420. Other embodiments may include more or less than four state record handle registers 420, along with a state access unit 214 capable of making more or less than four state record changes at once.

The state access unit 214 includes four sets of input multiplexers 1004. Each set of input multiplexers 1004 contains one or more input multiplexors 1004. The state record 1002 is one input to the input mulitplexors 1004, and information 1010 from an action entry 800 provides other input to the input multiplexors 1004. A state record format decoder 1018 puts the information 1010 in a form usable by the input multiplexors 1004, and sends the correct data to the correct input multiplexor 1004. The input multiplexors 1004 perform premodification functions (also known as preprocessing functions) on the state record 1002 to prepare the state record 1002 for modification. The premodified state records 1002 from the input multiplexors 1004 are a first operand input to the arithmetic logic units 1006.

There are four arithmetic logic units 1006 that make the changes to the data within the state record 1002. The output of the input multiplexors 1004 is one input to each arithmetic logic unit 1006. There are four operand multiplexors 1008 in the state access unit 214. The output of each the operand multiplexors 1008 is the other operand input to the arithmetic logic unit 1006.

There are several data sources 1020 that may be selected to be used as the second operand input to the arithmetic logic unit 1006. Each of these data sources 1020 is input to four operand multiplexors 1008 (one for each arithmetic logic unit 1006). The operand multiplexors 1008 also receive a filter input 1012 that determines which one of the multiple possible data sources 1020 will be used as the second operand input to the arithmetic logic unit 1006. In the illustrated embodiment, the three operand data sources 1020 are the information from one or more of the key registers 416 of the packet context 204, the information from the packet size registers 404 of the packet context 204, and user data 812 from the action entry 800. In other embodiments, other information can also be used as an operand data source 1020. Information from the control word 810 of the action entry 800 is used as a filter input 1012. Thus, the action entry 800 that causes the modification of the state record 1002 also includes information that determines what data source 1020 is used as the second operand input to the arithmetic logic unit 1006.

The control word 810 of the action entry 800 also determines the state record 1002 modification operation performed by the arithmetic logic unit 1006. This operation input 1022 is sent to the arithmetic logic unit 1006 in addition to the two operands. The arithmetic logic unit 1006 then performs the operation that modifies the state record.

The output of the arithmetic logic unit 1006 as well as the input state record 1002 are input to four sets of output multiplexors 1014. Each set of output multiplexors 1014 can include one or more output multiplexors 1014. Information 1010 from the action entry 800 that prompted the modification of the state record 1002 also provides other input to the output multiplexors 1014. The state record format decoder 1018 also puts the information 1010 in a form usable by the output multiplexors 1014. The output multiplexors 1014 perform postmodification functions (also known as postprocessing functions) to place the modified state record in proper form for output. The output from the output multiplexors 1014 is combined and output as the modified state record 1016.

Figure 11:
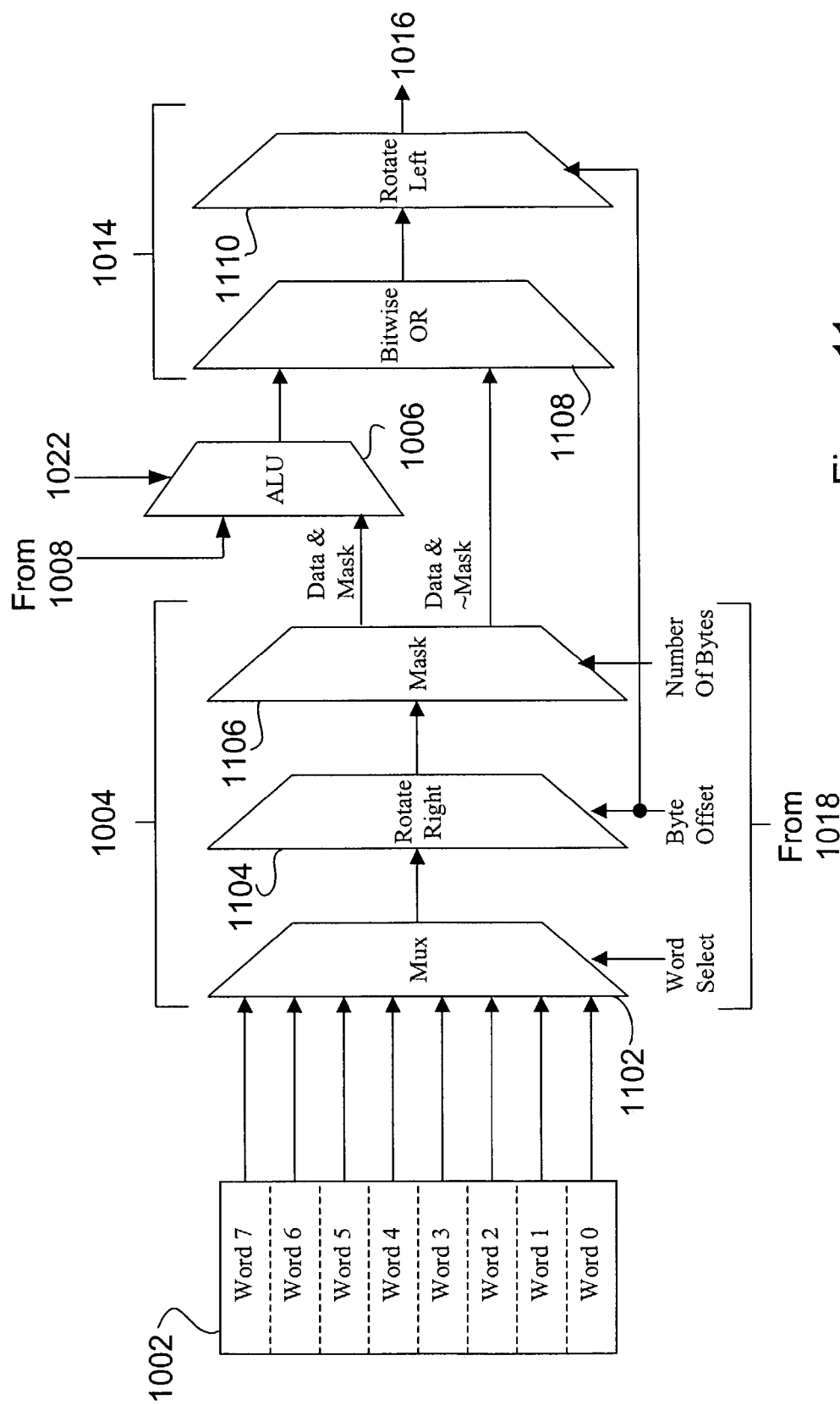
FIG. 11 is a block diagram that provides more detail of one of the four paths for modifying the state record of the state access unit.

FIG. 11 is a block diagram that provides more detail of one of the four paths for modifying the state record 1002 of the state access unit 214, as well as more detail of the input and output multiplexors 1004, 1014. The input and output multiplexors are also known as input and output modules or units. The input multiplexors 1004 include a word select multiplexer 1102, a rotate right multiplexer 1104, and a mask multiplexer 1106. The state record 1002, which has eight words in one embodiment, is input to the word select multiplexer 1102. Information 1010 from the action entry 800 includes information indicating which word or words of the state record 1002 will be modified. The state record format decoder 1018 decodes this information and sends the identity of the word or words to be modified to the word select multiplexer 1102. The word select multiplexer 1102 then outputs the indicated word or words from the state record 1002.

The word or words to be modified are received by the rotate right multiplexer 1104. Information 1010 from the action entry 800 also includes the byte offset that indicates the location within the word or words that will be modified. The state record format decoder 1018 decodes this information and sends the byte offset to the rotate right multiplexer 1104. The rotate right multiplexer 1104 rotates the information within the word or words to be modified so that the information is in the proper position to be modified by the arithmetic logic unit 1006. The rotate right multiplexer 1104 then outputs the rotated word or words.

The rotate word or words are received by the mask multiplexer 1106. Information 1010 from the action entry 800 also includes the number of bytes that will be modified. The state record format decoder 1018 decodes this information and sends the number of bytes to be modified to the mask multiplexer 1106. The mask multiplexer 1106 creates a mask so that the correct bytes within the word or words will be modified by the arithmetic logic unit 1006. The mask multiplexer 1106 also creates the inverse of this mask. The mask multiplexer 1106 outputs the rotated word or words masked by the mask, and also outputs the rotated words or words masked by the inverse of the mask.

The arithmetic logic unit 1006 receives the masked rotated word or words, a second operand from the operand multiplexer 1008, and the identity of the operation to be performed from the operation input 1022. The arithmetic logic unit 1006 then uses the masked rotated word or words and the second operand to perform the identified operation to modify the word or words. The modified word or words is output from the arithmetic logic unit 1006.

The output multiplexors 1014 include a bitwise or operator 1108 and a rotate left multiplexer 1110. The bitwise or operator 1108 receives the modified word or words from the arithmetic logic unit 1006 and also receives the rotated word or words that have been masked by the inverse of the mask. The bitwise or operator 1108 combines these two inputs to result in a word or words that includes the changes made by the arithmetic logic unit 1006 as well as the other data in the word or words that remains unmodified. These word or words are thus the modified but rotated word or words and are output from the bitwise or operator 1108.

The rotate left multiplexer 1110 receives the modified rotated word or words. The byte offset received by the rotate right multiplexer 1104 is also received by the rotate left multiplexer 1110. The rotate left multiplexer 1110 uses the byte offset to rotate the information within the word or words back to its original position. The result of this operation is the modified word or words from the state record 1002. This is combined with the results from the other rotate left multiplexors 1110 to form the modified state record 1016.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. Persons skilled in the art will recognize various equivalent combinations and substitutions for various components shown in the figures. It is therefore intended that the scope of the invention be limited not by this detailed description, but rather by the claims appended hereto.

We claim:

1. A system for modifying a state record related to processing of a packet, comprising:
   a plurality of modification paths, each modification path capable of making a modification to a state object within the state record in parallel with the other modification paths, and each of the plurality of modification paths including:
      one or more preprocessing modules for receiving the state record and preparing the state object to be modified by that modification path for modification, wherein the preprocessing modules include a word select multiplexer for selecting the state object from a plurality of state objects within the state record, a first rotate module for shifting information within the state object to a selected position, and a mask module for creating a mask about the selected position so that a selected portion of the state object is modified;
      a logic module for receiving the prepared state object from the one or more preprocessing modules and modifying the state object; and
      one or more postprocessing modules for receiving the modified state object and preparing the state record for output.

2. A method for modifying a state record related to processing of a packet, comprising:
   selecting an object within the state record to be modified;
   performing a first offsetting process the information within the object;
   masking the object with a mask;
   applying an inverse of the mask to a copy of the object;
   modifying the masked object;
   combining the modified object with the copy of the object to which an inverse mask has been applied; and
   performing a second offsetting process on the combined modified object to reverse the first offsetting process.

3. A computer program product comprising a computer-readable medium containing computer program code for modifying a multiple state objects within a state record related to processing of a packet, the computer program code comprising instructions for performing, on each of the multiple state objects in parallel, the steps of:
   receiving information indicating a state object within the state record to be modified;
   selecting, according to the received information indicating the state object within the state record to be modified, the indicated state object to be modified;
   receiving information indicating a byte offset for the state object to be modified; performing, according to the received information indicating the byte offset for the state object to be modified, a first offsetting process the information within the state object;
   receiving information indicating a size of a piece of information within the state object to be modified;
   masking the state object with a mask, according to the received information indicating the size of the piece of information within the state object to be modified;
   applying an inverse of the mask to a copy of the state object;

receiving information indicating a modification to be performed on the state object;

modifying the masked state object, according to the received information indicating the modification to be performed on the state object;

combining the modified state object with the copy of the state object to which the inverse mask has been applied; and performing a second offsetting process on the combined modified state object to reverse the first offsetting process, according to the received information indicating the byte offset for the state object to be modified.

4. The system of claim 1 wherein the postprocessing modules include:

a bitwise OR module for combining a portion of the state object modified by the logic module with an unmodified portion of the state object received from the mask module; and a second rotate module coupled to the bitwise OR module for shifting the information within the state object back to its original position.

* * * * *